United States Patent [19]

Abramson et al.

[11] 4,005,276

[45] Jan. 25, 1977

[54] DIGITAL VOICE SIGNALING WITH DIGITAL ECHO DETECTION AND VOICE ACTIVITY COMPRESSION USED TO CANCEL ECHO

[75] Inventors: Paul Abramson, Raleigh, N.C.;
Ulrich Appel, Munich, Germany

[73] Assignee: International Business Machines Corporation, Armonk, N.Y.

[22] Filed: Mar. 20, 1975

[21] Appl. No.: 560,423

[52] U.S. Cl. .................. 179/170.2; 179/15 AS; 179/170.8

[51] Int. Cl.² .................................. H04B 3/20

[58] Field of Search ......... 179/170.2, 170.6, 170.8, 179/15 AS

[56] References Cited

UNITED STATES PATENTS

| | | | |
|---|---|---|---|
| 2,958,733 | 11/1960 | Dickieson | 179/15 AS |
| 3,046,347 | 7/1962 | Miedema | 179/15 AS |
| 3,562,448 | 2/1971 | May, Jr. | 179/170.6 |
| 3,673,355 | 6/1972 | La Marche et al. | 179/170.6 |
| 3,821,494 | 6/1974 | Besseyre | 179/170.6 |
| 3,823,275 | 7/1974 | La Marche et al. | 179/170.2 |

*Primary Examiner*—Kathleen H. Claffy
*Assistant Examiner*—Randall P. Myers
*Attorney, Agent, or Firm*—Robert Lieber

[57] ABSTRACT

A connection system for varied distance digital communication capable of handling telephone signals utilizes Voice Activity Compression (VAC) to effectively share a given number of digital transmission channels among a greater number of virtual telephone connections. The telephone signals are delta-modulated and demodulated in system connection stations. The VAC processing circuits with a small increment of decision logic provide echo suppression. Echo suppression is thereby rendered as a "value-added" service at a relatively small increment of station cost over the cost of VAC processing. Echo interference with original telephone signal activity in the send channels is reduced by digital control of gain in the demodulation stage. The system also provides connections without VAC handling subject to echo control.

12 Claims, 8 Drawing Figures

FIG. 1 SYSTEM STATION APPARATUS FOR CONNECTION & SELECTIVE VAC

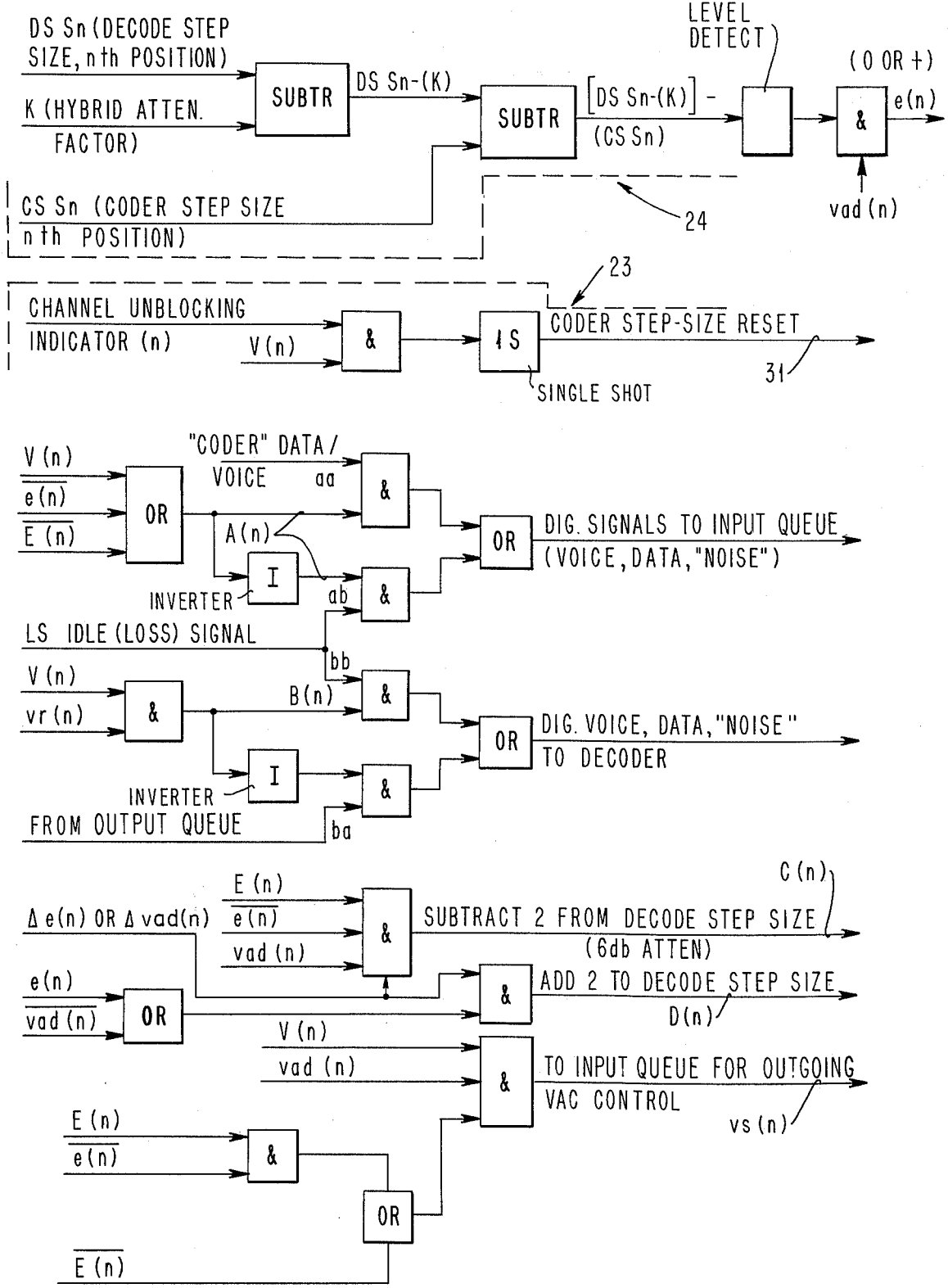

DIGITAL VOICE SIGNALING WITH DIGITAL ECHO DETECTION AND VOICE ACTIVITY COMPRESSION USED TO CANCEL ECHO

CROSS-REFERENCES TO RELATED PATENTS, PATENT APPLICATIONS AND PUBLICATIONS

U.S. Pat. No. 3,821,494 granted June 28, 1974 to Besseyre.

U.S. Pat. application Ser. No. 560,422, filed Mar. 20, 1975, entitled "Loss Signal Generation for Delta-Modulated Signals", by U. Appel, assigned to the assignee of the present invention.

U.S. Pat. application Ser. No. 537,211 by H. G. Markey et al, filed Dec. 30, 1974, entitled "Access Method and Station Apparatus for Compressed Handling of Digital Voice and Data Signals Relative to a High Speed TDMA Facility" and assigned to the assignee of the present invention.

Vol. 16, No. 11 of the IBM Technical Disclosure Bulletin, Pages 3702–3705 and 3709–3710 (three articles, two by U. Appel and one by P. Abramson and U. Appel).

Field of the Invention

The invention relates to echo suppression in digital telephone communications; and especialy in time multiplex long distance systems using a Time Assigned Speech Interpolation (TASI) technique for digital communication which is characterized herein as Voice Activity Compression (VAC). VAC is a processing and signaling technique used for selective allocation and de-allocation of real transmission channels to virtually continuous telephone connections whereby actual continuity is provided only during periods of above-threshold signal activity in transmitting circuits which share the allocatable channels.

Statement of the Problem

Telephone signal communications with long transmission delays (e.g. via satellite) are subject to severely disruptive echo interference; usually due to hybrid coupling between duplex paired sending and receiving trunks. Theoretically it is possible to delegate responsibility for controlling echo interference to connected users and intermediate carriers. However, this can be quite expensive and for reasons which will be apparent from the following background and summary discussions it is practically burdensome and inefficient.

Environmental Background and Prior Art

The present invention involves adaptation of communication systems having VAC capability for echo suppression. One such system is described in the above cross-referenced patent application by H. G. Markey et al, Ser. No. 537,211; the disclosure thereof being incorporated herein by this reference. In said system VAC is used to effect interpolative allocation and de-allocation of time division multiplex TDM channels for carrying delta-modulation coded telephone signals and digital data signals. Station apparatus of the system performs initial delta-modulation conversion of analog telephone signals supplied at station inlet ports, and Voice Activity Detection (VAD) associated with transmissive VAC handling relative to signals processed by the initital conversion circuits. The station apparatus also uses VAC information received from remote stations to control decompression handling relative to delta-modulation decoding circuits and telephone outlet ports.

Delta-modulation coding and decoding arrangements, disclosed variously in said system application by Markey et al and in the above cross-referenced Technical Disclosure Bulletin articles by U. Appel and P. Abramson, emply digital integration of adaptive step-size arguments (integrands) to maintain companded digital representations of input and output telephone signals.

As the step size associated with adelta-modulation coding channel varies above and below a predetermined value representing an activity threshold level (e.g. a value representing −33 dbm) the Voice Activity Detection (VAD) circuits operate to indicate activity and inactivity conditions which are used by the VAC processing facility to assign real transmission channels only during periods of above-threshold activity. Information indicating the real continuity condition of the virtually continuous connection associated with the coding channel is transmitted via the VAC signaling facility (over another TDM channel) for use in controlling demultiplexing.

Summary of the Invention

According to the present invention the foregoing VAD and VAC operations are extended to selectively control echo suppression. Echo detection is performed digitally by techniques functionally similar to techniques disclosed in the Besseyre patent referenced above. A logical examination is conducted relative to representational levels of the integration functions processed in the delta-modulation coding and decoding channels of telephone sending and receiving connections paired in duplex association. The examination logic employed is capable of distinguishing between transmissive activity due solely to echo in the send (coding) channel and simultaneous original transmissive and receptive activity in the send (coding) and receive (decoding) channels.

The response to each condition is different. "Echo only" activity is suppressed relative to VAC connections by operation of the VAC controls as for a VAD indication of inactivity. The integration step size of the remote demodulator is adjusted to "loss" or "idle" level (reference the disclosure of concurrently filed application Ser. No. 560,422 by U. Appel identified above and incorporated herein by this reference). Echo-only activity relative to non-VAC (non-blockable connections is suppressed by idle signal insertion at the transmitter (reference Appel application above). Bidirectional activity is not suppressed, but the reception gain is reduced digitally by subtracting 2 from the step size used in the demodulator integrator refer to the IBM Technical Disclosure Bulletin articles cited above thereby reducing echo interference (due to possible echo coupling through hybrids located between the station and user). Since the listener is simultaneously talking the reduced gain does not affect service quality.

The VAC and echo control handling is logically modular so that echo suppression, receive gain control and VAC processing can be applied as needed. Thus, telephone signals passed over certain long distance virtual telephone connections may be given both echo control and VAC handling; whereas data signals not subject to echo coupling may be passed through VAC allocated channels without echo control handling. And data and telephone signals passed over short haul local or tandem connections, which are not subject to disruptive echo interference and do not use VAC channel allocation, receive neither echo control handling nor VAC-related handling.

It is an object of this invention to provide efficient echo control in telephone connections over TDM (time division multiplex) digital communication facilities having shared time channels subject to tot allocation and de-allocation for accomplishing VAC.

It is another object to provide extended VAD/VAC handling for "serendipitous" echo suppression in such facilities.

Another object is to provide for logical processing of telephone-related digital signals for effecting selective control of echo suppression, and for effecting selective adjustment of reception gain for reducing interference in transmission activity.

Another object is to provide for modular logical organization of connection station circuits for controlling VAC, VAD, echo suppression and echo interference whereby the handling of telephone-related digital signals may be selectively varied to accommodate various connections requiring different handling.

The foregoing and other objects, features, aspects and advantages hereof will be more fully appreciated by considering the following description and claims.

DETAILED DESCRIPTION OF THE DRAWINGS

Figure 1:
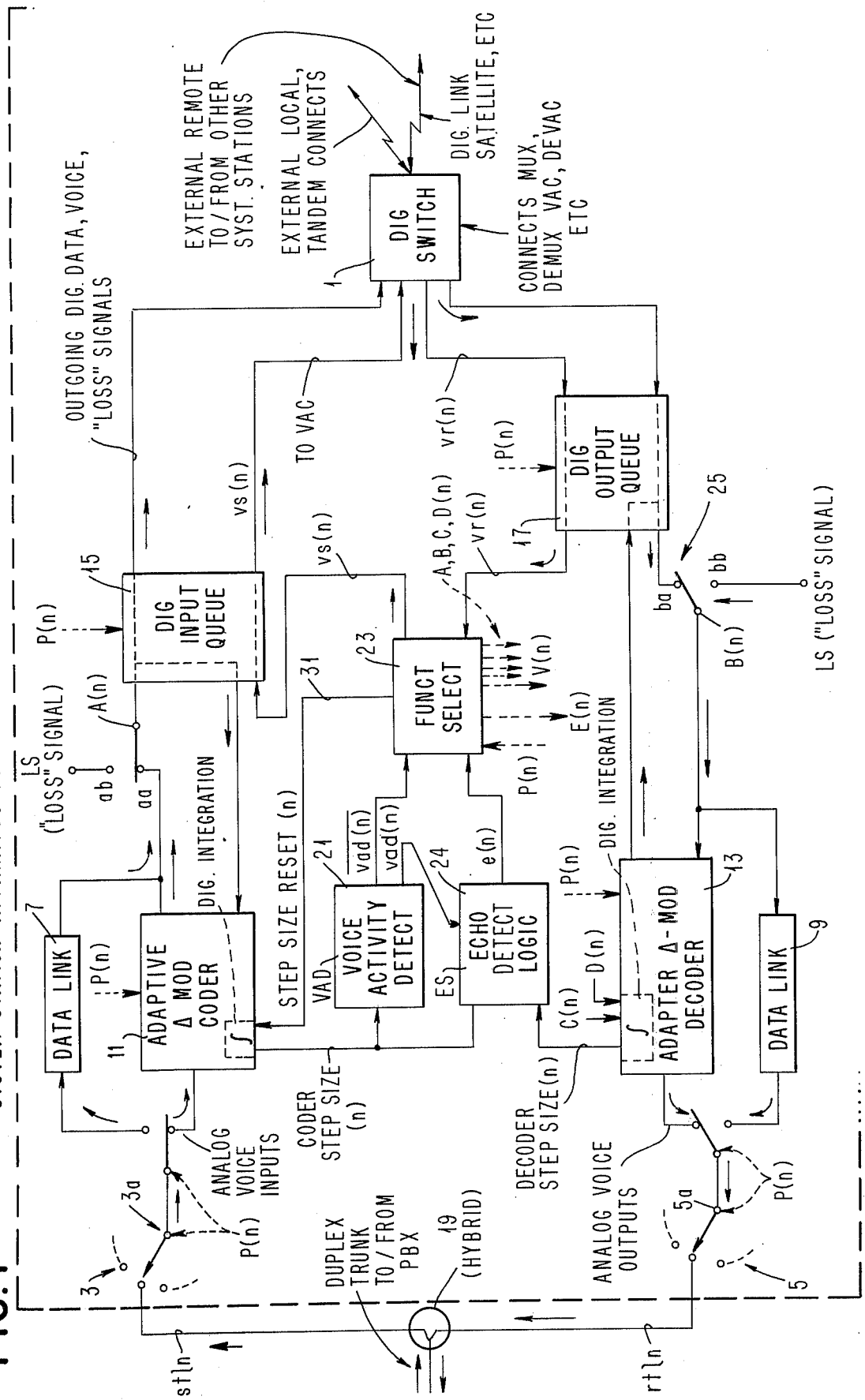

FIG. 1 schematically illustrates the present invention as appplied in the station apparatus and environmental system disclosed in the above cross-referenced U.S. Patent Application, Ser. No. 537,211 by H. G. Markey et al;

FIGS. 2–7 schematically illustrate various equivalent telephone circuits formed between virtually connected station ports, at specific times in the multiplex time continuum of the Markey et al disclosure and for various activity and echo-related conditions of the affected station channels; and FIG. 8 schematically illustrates the logic for selective control of echo suppression, receive gain adjustment, and "idle signal insertion" in accordance with the present invention.

DETAILED DESCRIPTION

Although not restricted to use therein the invention is described in application to the station apparatus and time division multiple access satellite communication system described in the above-referenced patent application by Markey et al in order to illustrate and emphasize its power and versatility. As indicated previously the disclosure of Markey et al application is incorporated herein by reference. In this system station to station connections are established between input/output station ports, through operation of digital switching equipment (indicated schematically at 1 in FIG. 1).
The equipment is capable of forming virtually continuous variably routable connections in local, tandem and toll configurations. Certain toll connections via digital links and satellite are actually intermittent (blockable) due to VAC operations. Station ports subject to transmissive connection to system channels (and thereby to other station ports) are indicated at 3 and ports subject to receptive connection to system channels (and thereby to transmissive ports of other stations) are shown at 5.

Such station apparatus is capable of performing transmissive and receptive voice activity compression VAC operations relative to certain toll connections and channels (satellite and digital trunk) as described by Markey et al. These operations involve allocation and de-allocation of shared groups of time multiplex channels among larger groups of virtual system connections carrying digital telephone and data signals.

As indicated in FIG. 1 the system is adaptive to handle both data signals (via transmissive data coupling 7 and receptive data coupling 9) and digital telephone signals (via transmissive delta-modulation coversion coupling 11 and receptive demodulation conversion coupling 13). The transmissive (receptive) coupling circuits 7, 11 (9, 13) are shared by multiple transmission (reception) ports 3 (5). Not-shown switched connections through switch circuits 1 are made by call processing circuits (also not shown) described in the above-refenced Markey et al application. The switch circuits 1 and associated call processing circuits form no part of the present invention. The circuits 1 provide local and toll connections to not-shown other stations and their respective inlet/outlet ports. Certain of these connections receive VAC processing and others do not. Some receive echo control handling in accordance herewith and others do not.

Input ports having connected status are recurrently sampled. Analog telephone signal samples are converted to delta-moldulation coded digital signals and stored in input queue 15 for block multiplex handling through switch 1. Telephone signals received from other stations through switch 1 in delta-modulated form are placed in output queue 17 for digital integration and decoding conversion to analog signal form relative to outlet ports 5. The circuits 11 and 13, in the present environmental system, comprise adaptive delta-modulation coding and decoding circuits. Station ports are externally connectable to telephone sets (via trunks and public and private exchange apparatus) for voice and digital signaling, and to non-telephone data transmission and reception gear. Of primary interest presently are the duplex telephone links $stl$, $rtl$ ($s$ for send, $r$ for receive). FIG. 1 indicates one such pair $stln$, $rtln$ externally coupled by hybrid 19 to PBX equipment and internally to the $n^{th}$ sampling position of station switch apparatus $3a/5a$ used for input/output scanning; these positions being associated with state $P(n)$ of position parameter P. Such pairs cross-connect through the indicated station and other stations with like pairs remotely situated (local send with remote receive, local receive with remote send).

The adaptive delta-modulation coding and decoding circuits are described in the above-referenced Markey et al patent application and in the above cross-referenced Technical Disclosure Bulletin articles by Appel and by Appel and Abramson (also incorporated herein by reference). It will be understood therefore that the coding circuits 11 produce a delta-modulation bit signal per line sample together with a companded digital integral representation corresponding to the analog telephone signal volume on the associated send trunk line. The delta-modulation samples are accumulated for block transfer through connections pre-established in switching apparatus 1 and the integral representations are held for use in subsequent sampling processes.

Likewise it will be understood that the decoding apparatus 13 operates interactively with decode queueing circuits 17 to provide companded digital integration of delta-modulated telephone signals received through system channels, and conversion of successive integral representations into decompanded analog signal samples which are transferred to connectively-associated ports 5 in appropriate sampling intervals.

It will be further understood that the companded integration operations associated with coding and decoding utilize varying digital integrands, or step-size argument functions, which are related to the decompanded analog signal (volume) level on the respective line. These operations are fully described in the above-referenced Markey et al application and Technical Disclosure Bulletin articles. Also, a similar coding and decoding configuration is described in U.S. Pat. No. 3,821,494 to Besseyre, cross-referenced above.

The VAC (voice activity compression) processing and signaling operation is described next in respect to its extension to the present invention. Voice activity detection (VAD) circuits shown at 21 in FIG. 1, and described in the above-referenced Markey et al application and Technical Disclosure Bulletin articles, digitally monitor the activity levels of the input telephone signals received by coding circuits 11 (e.g. by step-size inspection) and determine when the voice signal volume is above a predetermined threshold level (e.g. a predetermined step-size value). The binary signals $vad(n)$ indicate whether associated trunk line signal activity is below or above the threshold level (0 for below or equal and 1 for above). Activity (1) and inactivity (0) indications of $vad(n)$ are processed by function select logic 23 to produce logically related signals $vs(n)$ for each telephone input scan position $P(n)$. These are staged and queued in association with the respective delta-modulation code samples in storage 15. The indications $vs(n)$ are used by connection switching circuits 1 for VAC channle allocation relative to remote toll connections (via digital trunk and/or satellite) to stations having suitable reception facilities for VAC processing (de-VAC'ing) as described in the above cross-referenced Markey et al patent application. For system telephone connections which are relative to remote stations not employing VAC the functions $vs(n)$ are disabled.

In accordance with the present invention the functions $vs(n)$ are also utilized to control echo suppression relative to VAC-related "virtual" toll connections (deemed virtual because the connections are made relative to shared channels which provide virtual continuity but are effectively interruptible by VAC de-allocation operations). Echo detection circuits 24 develop echo-related binary control indication $e(n)$ for each scanned duplex telephone connection. This is used by function select logic 23 as an additional logical argument in the determination of $vs(n)$ and in development of other control parameters $A(n)$, $C(n)$ described below. Signal $e(n) = 1$ represents a condition calling for echo suppression control relative to the system connection channel associated with the $n^{th}$ scan position. It will be recognized that not all telephone trunk connections require echo suppression control; in general, short haul local and tandem connections will not require such control.

Echo detection circuit 24 may operate either by comparing the step-size integrand representations utilized in the coder and decoder circuits 11 and 13 [e.g. using the rule that $e(n) = 0$ if send step size exceeds receive step size, and that $e(n) = 1$ otherwise], or in any other suitable manner; for instance as described in the Besseyre U.S. Pat. No. 3,821,494 cross-referenced above. Basically the objective of such operation is to distinguish, preferably by digital means, when bidirectional signal activity in the send and receive segments of a duplex station telephone connection represents independently originated activity and when it represents an "echo-only" condition in the send segment. Independently originated activity is not suppressed. Echo-only transmission activity is to be suppressed.

For echo-only the function $e(n)$ is conditioned to the 1 representational level and causes the condition of the corresponding $vs(N)$ signal to be 0. The condition $vs(n) = 0$ is treated by the VAC controls as representing effective inactivity at the $n^{th}$ input scan position, although the corresponding $vad(n)$ condition may not be 0. Thus, echo activity relative to VAC channel facilities is effectively suppressed due to VAC de-allocation of the shared virtual transmission channel.

When there is bidirected independently originated activity control parameter $C(n)$ produced by logic 23 is activated to effectively reduce reception gain by 6db. This is accomplished by subtraction of 2 from the decode step-size count. Thus, while transmissive continuity is maintained by the VAC controls the reception gain is reduced, thereby reducing any possible echo interference relative to the coder input by 6db. In the case of "echo-only" transmissive activity $[e(n) = 1, vad(n) = X$ (X denoting "don't care")] the reception gain is not reduced and forward continuity is blocked.

The echo discrimination logic of circuits 24 is based on the logical premise that echo coupling from $rtln$ to $stln$ via hybrid 19 is subject to at least some finite attenuation (K) and therefore that echo activity at the input interface is necessarily of smaller magnitude than the receptive activity presented via the decoder to the associated output interface. This does not mean that transmissive echo-only activity will have below-threshold magnitude [i.e. $vad(n)$ could be 1]. Hence the need for the additional controls $e(n)$ described above to condition $vs(n) = 0$ for echo activity supprssion.

On the other hand, simultaneous bidirected original telephone activity is associated with an input signal level equal to or exceeding the associated output signal level and also exceeding the VAD threshold. Consequently the associated condition for this is $vad(n) = 1$ and $e(n) = 0$, permitting $vs(n) = 1$ and thereby permitting VAC continuity to be maintained relative to the remote station. The receive gain reduction used in this situation enhances the transmission quality.

VAC-processed telephone signals are accompanied by VAC mask channel use signals described in the Markey et al application which control decompression (de-VAC) handling at the receiving station. The received mask signals represented presently by $vr(m)$, the variable $m$ being used to distinguish scan positions at a "remote" station from scan positions at a communicatively linked "local" station (e.g. as in FIG. 2), are passed to the output queue 17 for handling together with associated delta-modulated telephone signals. The condition $vr(m) = 1$, represents unblocked transmission over VAC-allocated channels relative to output scan position $m$ of the receiving station. Inferentially, it also represents transfer of original (non-echo) from the remotely connected transmitting station. It is used to condition control parameter $B(m)$, represented schematically at 25 as a switch contact, to connect output queue 17 to decode circuit 14 (contact B to position $ba$) for "normal" digital integration and decoding.

The reverse indication $vr(m) = 0$, represents blocking of the associated VAC-allocated virtual system channel, and indicates that the remote virtually connected telephone source is either inactive, or supplying echo-only activity. As described in the above-referenced Markey et al application, the channel may also be blocked due to contention (freeze-out) but this is not relevant presently. When $vr(m) = 0$ and $V(m) = 1$ "idle" signal LS is supplied to the decoder (B to position $bb$) constraining the decoder step size to below threshold level and reproducing audibly as low volume noise. Signal LS consists of binary sequence which is essentially pseudo-random in character but logically constrained so that no more than a predetermined number of consecutive bits can have the same value. The constraint is associated with the activity threshold and constrains the step size of the corresponding decoder integration to be at or below the activity threshold level. The purpose of such loss or idle signal insertion is to maintain step-size correspondence at the receiving and transmitting ends of the blocked connection while avoiding a "dead line" sound effect at the telephone receiver. This insertion is fully described in the above cross-referenced co-pending application by Appel Ser. No. 560,422. Only its utilization in combination with VAC processing and channel blocking is deemed presently of interest.

Idle signal insertion is also utilized transmissively relative to input queue 15 for suppression of echo relative to unshared (non-VAC) channels. Control represented by contact A is set normally in position as for telephone signal handling. However, for inputs subject to echo control $[E(n) = 1]$ and subject to VAC handling $[V(n) = 0]$ echo manifested by $e(n) = 1$ is effectively suppressed by setting A to position $ab$. This feeds the above-mentioned low level "noise" signal LS into input queue 15 relative to input scan position $P(n)$ causing corresponding "constrained pseudo noise" transmission relative to that position. Also, due to feedback coupling between queue 15 and coder 11, this constrains the coder step size for the associated position at or below threshold condition. This transmissive echo suppression operation is also fully described in the above-referenced patent application by Appel. Only its selective and combinational usage as presently described is considered presently relevant.

Logic 23 has an additional output 31 for resetting the coder step size to threshold level as connections blocked by VAC operation become unblocked. This is used to establish integration level correspondence between the sending coder and the remote decoder, hereby avoiding unusual swings in reception volume.

Consider now FIGS. 2 – 7 showing various equivalent circuit station-to-station (also port-to-port) connection configurations associated with operation and non-operation of echo control and receive gain attenuation features of invention described above. These represent conditions of transmission continuity in the system transmission facility (local, tandem or toll) used in the connection. Toll facilities may include one or more digital link (point-to-point) and satellite (point-to-multipoint) segments as described in the Markey et al application.

Figure 2:
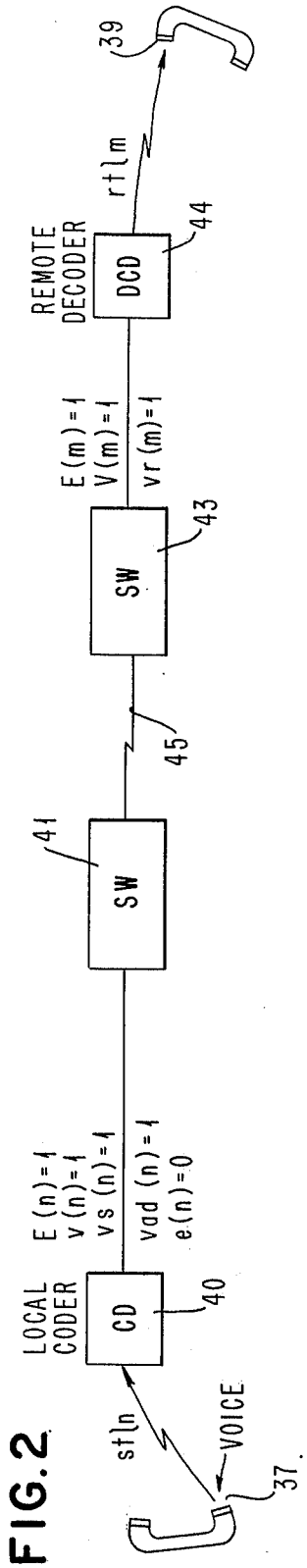

FIG. 2 shows the continuity of a toll telephone connection with VAC channel segment(s) from telephone speaker 37 to telephone audible receiver 39 in which original (true) input activity is handled through transmission station circuits associated with speaker 37 — i.e. coder 40 and switch system 41 — and reception station circuits — i.e. switch system 43 and decoder 44 — associated with remote receiver 39. The channel virtually allocated in the intervening transmission facility (single or multi-segment) 45 is unblocked. The connection from speaker 37 to receiver 39 includes channel segments associated with coder scan position $n$, switch system 41, facility 45 switch system 43, and decoder scan position $m$. This is schematic of course and does not show intermediate PBX and public carrier exchange segments between speaker 37 and coder 41 (although such may indeed be present) or between decoder 44 and receiver 39.

The controls permitting unblocked VAC handling are appropriately conditioned at the transmitting and receiving stations [i.e. $V(n) = vs(n) = 1$ at 40 and $V(m) = Vr(m) = 1$ at 44]. The controls E permitting echo suppression are enabled relative to both stations $[E(n) = E(m) = 1]$, but since there is input activity not solely due to echo $[vad(n) = 1; e(n) = 0]$ $vs(n)$ remains in the enabling condition permitting unblocking of virtual channel 45 (absent contention, or "freeze-out", conditions not presently of interest which are disclosed in the Markey et al application) due to the logic (FIG. 8) used for generation of $vs$ $[vs = V.vad.(E. + E)]$. The received VAC indication $[vr(m) = 1]$ indicates effective continuity of the channel 45 relative to output scan position $m$.

Figure 3:
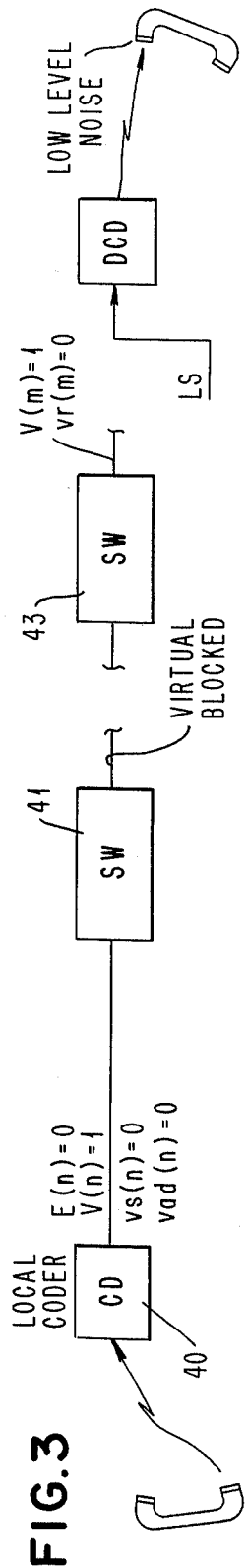
Figure 4:
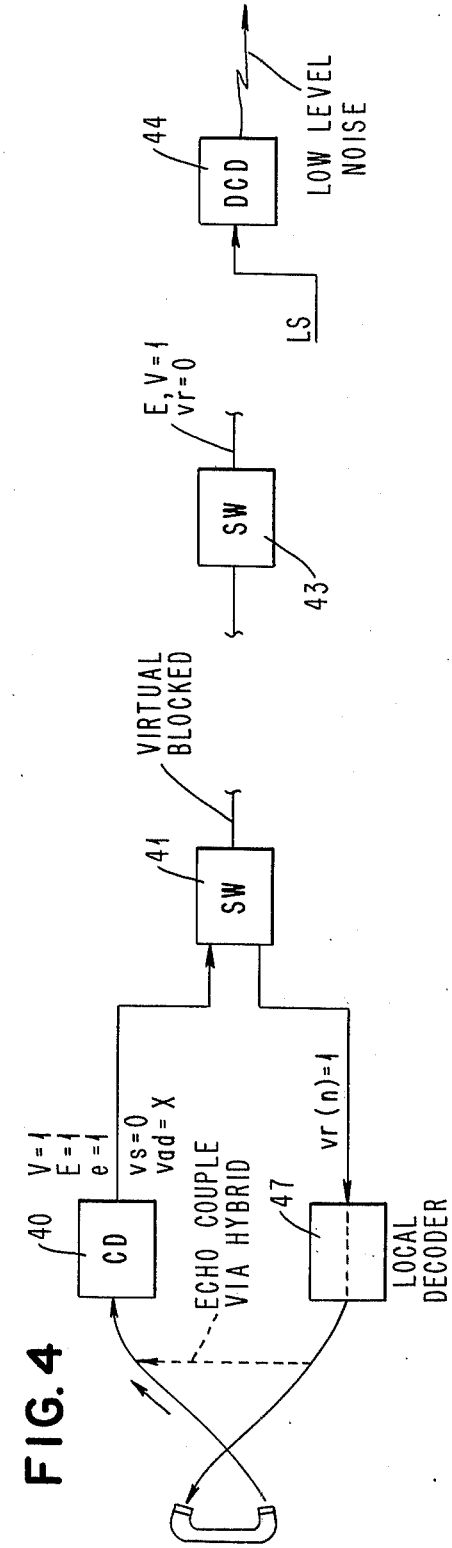

FIGS. 3 and 4 show equivalent blocked channel configurations, due to $vs(n) = 0$, for the connection circuit of FIG. 2. This occurs either when $vad(n) = 0$ (no input activity as in FIG. 3) or when echo control is appropriately conditioned $[e(n) = 1]$ to indicate input of echo-only as in FIG. 4.

Figure 5:
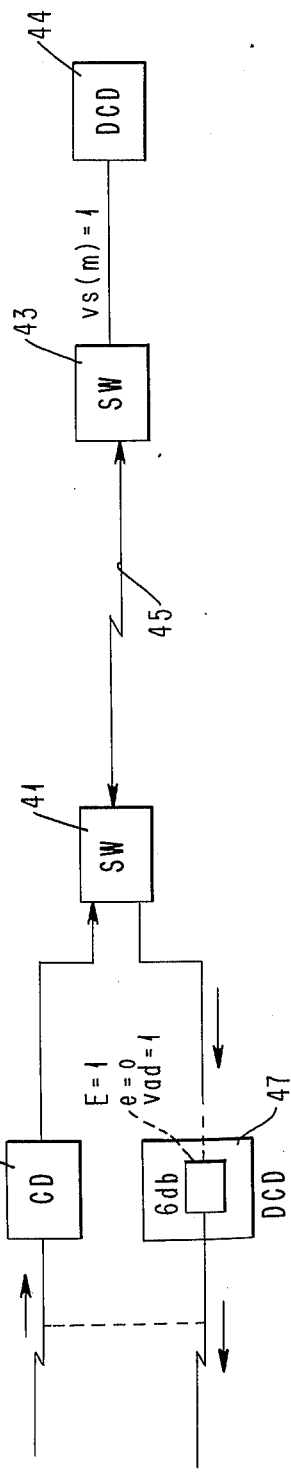

FIG. 5 indicates use of 6db receive gain adjustment to reduce potential input echo inteference during simultaneous input/output activity. Gain reduction is accomplished by subtraction of 2 from the step-size count for the affected ($n^{th}$) output position. The control parameters ($E = 1$, $e = 0$, $vad = 1$) indicate activity and possible output activity in the duplex-paired $n^{th}$ positions of coder 40 and decoder 47. This adjustment may be used relative to echo-controlled channels with or without VAC control.

Figure 6:
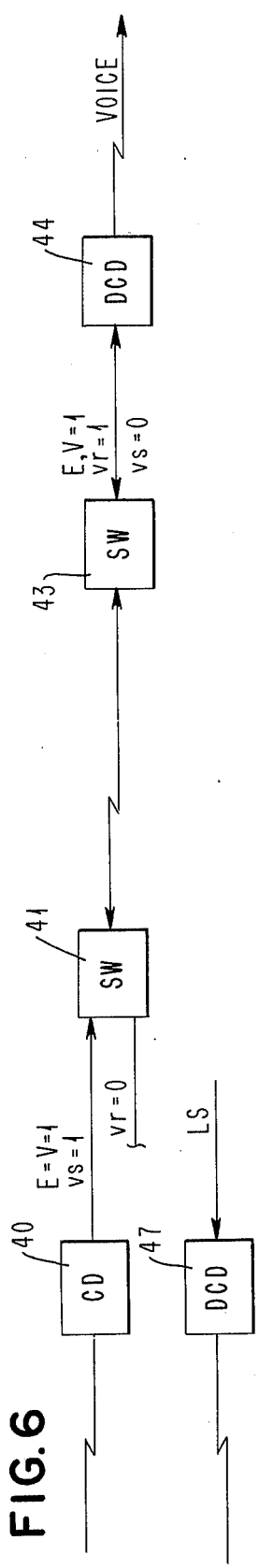
Figure 7:
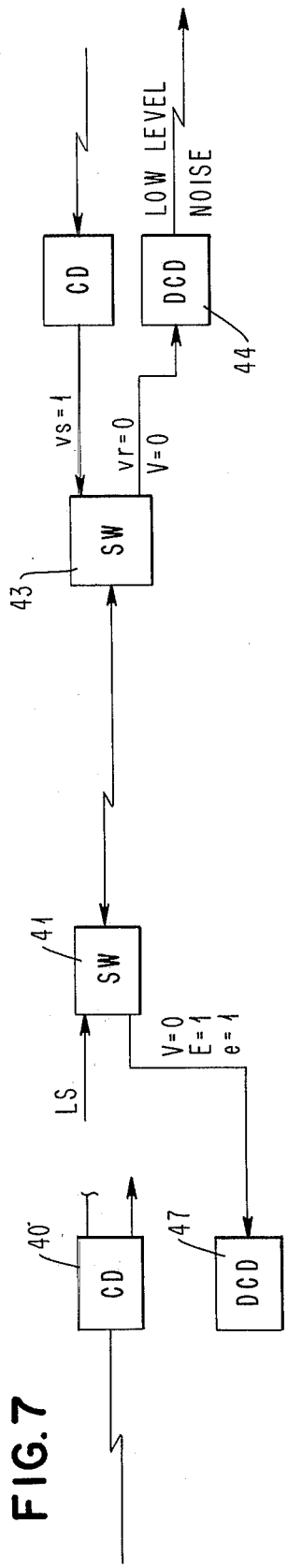

FIGS. 6 and 7 illustrate input and output use of idle signal insertion or substitution. FIG. 6 shows output insertion in the receiving path when $V(n) = 1$, $E(n) = 1$ and $vr(n) = 0$ (i.e. when "echo" or "inactivity" blocking occurs in a transmission channel subject to VAC allocation). FIG. 7 shows input idle signal insertion when $V(n) = 0$, $E(n) = 1$ and $e(n) = 1$ (i.e. when input activity in a non-blockable channel is due "solely" to echo). In both situations the function of the inserted signal as explained previously is to produce an artificial low volume audible noise effect in the associated telephone receiver and thereby effectively interrupt the connection without presenting a "dead" line to the listener.

The foregoing control and activity relations are summarized in the following "truth" table in which entries "X" represent "don't care" states.

Truth Table for VAC/Echo Control $n^{th}$

-continued

| | | | Line Position of Code/Decode Scan | | | | | C(n) | |
|---|---|---|---|---|---|---|---|---|---|
| V(n) | E(n) | vad(n) | e(n) | vr(n) | vs(n) | A(n) | B(n) | [-6db] | Note |
| 0 | 0 | X | 0 | 0 | 0 | aa | ba | NO | 1,3 |
| 0 | 0 | X | 0 | 0 | 0 | aa | ba | NO | 1,3 |
| 0 | 1 | X | 1 | 0 | 0 | ab | ba | NO | 1,4 |
| 0 | 1 | 1 | 0 | X | 0 | aa | ba | YES | 1,4 |
| 1 | 0 | 0 | X | 0 | 0 | aa | ba | NO | 2,3 |
| 1 | 0 | 0 | X | 1 | 0 | aa | ba | NO | 2,3 |
| 1 | 0 | 1 | X | 0 | 1 | aa | bb | NO | 2,3,4 |
| 1 | 0 | 1 | X | 1 | 1 | aa | ba | NO | 2,3 |
| 1 | 1 | 0 | 0 | 0 | 0 | aa | bb | NO | 2,4 |
| 1 | 1 | 0 | 1 | 1 | 0 | aa | ba | NO | 2,4 |
| 1 | 1 | 1 | 0 | 0 | 1 | aa | bb | YES | 2,4 |
| 1 | 1 | 1 | 0 | 1 | 1 | aa | ba | YES | 2,4 |
| 1 | 1 | 1 | 1 | 1 | 1 | aa | ba | NO | 2.4 |

Notes:
1. For non-Vac telephone connections [V(n) = 0] the associated decode stage is "continuously" coupled to the output queue [i.e. B = ba regardless of other parameters] and activity indicators vs(n), vr(n) are invariably 0. The echo indicator e(n) is a logical function of the echo control function E(n) and the comparative magnitudes of the associated ($n^{th}$ position) coder and decoder step-size counts. The source of line queue input (coder output if A = aa or LS if A = ab) is logically dependent upon the logical product (V).(E).(e). The control parameter C for -6db gain adjustment is conditioned upon the change in the logical product of E, $\bar{e}$ and vad.
2. In VAC-blockable telephone connections [V(n) = 1] input echo control is determined <u>by the state of</u> vs(n) = V(n).vad(n).[E(n). e(n) + $\overline{E(n)}$ ]. This blocks the virtual channel and the transmitted VAC signal received as vr(m) = 0 causes idle signal insertion on the receiving end.
3. With no echo control (E = 0) no use is made of transmissive idle insertion (A = aa for all states of e) and the 6db attenuation adjustment is never used (C = NO).
4. With echo control enabled (E = 1) input idle signal insertion (A = ab) and output idle signal insertion (B = bb) are conditioned upon VAC-related parameters. Input insertion is conditioned upon the logical product of $\overline{V(n)}$ , E(n) and e(n). Output insertion is conditioned on the logical product of V(n) and $\overline{vr(n)}$ . Receptive gain adjustment (C = YES) is conditioned upon the logical product of E(n), e(n) and vad(n) when there is a change in input activity Δe(n) or Δvad(n) (see FIG. 8). Re-adjustment (6bd increase) is made at the following change in activity by operation D (see FIGS. 1,8).

The logic of echo control, idle insertion and receptive gain attenuation is indicated schematically in FIG. 8 and is basically the logical depiction of the statements given in the foregoing table and notes.

System connections and conditions under which the foregoing parameters are applied are summarized as follows.

1. VAC (V(n) = 1) is used for virtual telephone connection through shared TDM channels between stations having VAC processing circuits. Digital data is carried through such channels under control of other not-shown VAC control parameters which are enabled throughout the duration of the connection (irrespective of activity) and take precedence over telephone traffic when there is contention.

2. Echo control (E(n) = 1) is used only for long haul telephone connections, real and virtual, which are subject to disruptive echo coupling. Digital data connections do not require echo control. Input idle signal insertion is used for non-blocking connections (V = 0). Output idle signal insertion is used relative to blocked connections selected by VAC (V = 1, vr = 0).

3. Echo gain adjustment is used when E = 1 and the input activity state has changed (Δe or vad). The subtractive adjustment (−6db) by C is made when the input activity transition is from inactive on echo-only to "active original". The reverse adjustment (+6db) by D is made upon the reverse transition (see FIG. 8).

While the invention has been particularly shown and described with reference to preferred embodiments thereof, it will be understood by those skilled in the art that various changes in form and detail may be made therein without departing from the spirit and scope of the invention.

What is claimed is:

1. In a multiplex digital communication system for mixed handling of data and telephone information between switching stations, said system including station apparatus for connectively processing digital signals representing digital data and audible telephone information between internal circuits of the station and multiplex channels linked to remote stations said circuits comprising multiple input and output circuits associated in pairs with respective pairs of space-separated sending and receiving lines served by said apparatus, said apparatus including threshold activity detection means coupled to said input circuits for detecting telephone information signals representing audible telephone activity exceeding a threshold and including multiplex digital switch channel assignment means for assigning subsets of said circuit selectively to be connected with said channels in repetitive multiplex frames of recurrence of said channels, by assigning said channels connectively only to input curcuits handling signals which represent data activity or above-threshold audible telephone activity, there being fewer said channels than said circuits, the improvement in said station apparatus comprising:

means coupled to repetitively scan said input and output circuits in pairs in coordination with said multiplex frames for providing first control signal indications distinguishing audible telephone signal activity in said input circuits due only to echo coupling between respective associated telephone line pairs;

means responsive to above-threshold activity indications supplied by said activity detection means and to said first control signal indications for producing second control signal indications distinguishing above-threshold audible telephone activity in said input circuits due to sources other than echo coupling only; and means for supplying said second control signal indications to said digital switch means, in time and space association with signals representing samples of respective input activity, for use in determining said channel assignments; whereby samples of telephone activity in said input circuits due only to echo coupling in associated lines may be indirectly suppressed by non-assignments of channels to carry said samples.

2. Station apparatus in accordance with claim 1, for indirectly suppressing telephone echo, in combination with:

means for repetitively receiving remotely originated telephone and data signals via said channels for selective distribution to said output circuits;

means for repetitively receiving remotely originated third control signals via said channels for designating said disbtribution;

a source of digital idle signals subject to audible telephonic reproduciton as noise having a volume less than a predetermined activity threshold level; and means cyclically responsive to said received third control signals to connect said output circuits to receive signals alternatively from said channels or from said source of idle signals, depending respectively upon whether said associated said third control signals represent remote assigment or non-assignment of channels to associated telephone circuits during a respective repetition cycle of reception of said third control signals.

3. Station apparatus in accordance with claim 1, for indirectly causing suppression of telephone circuit echo, in combination with:

means for indicating connective associations of said input circuits in telephone circuits via predetermined said channels which are not subject to cyclically varying assignment by said switch means; and a source of digital idle signals subject to audible telephonic reproduction as noise having a volume less than a predetermined threshold activity level;

said first control signal indications being used relative to telephone input circuits associated with said predetemined channels for blocking transmission of telephone samples representing echo-only activity and alternatively connecting said predetermined channels to receive input from said idle signal source whenever the respective first control indication represents the presence of echo-only activity in the associated input circuits.

4. Station apparatus in accordance with claim 1, in which said telephone samples are delta coded samples obtained with adaptive companding utilizing varying step-size integrands and subject to reverse decompanding in output handling in combination with:

means coupled to said activity detection means and activity distinguishing means for causing the step-size of decompanding relative to output telephone samples to be varied as the activity in associated input circuits varies between states of above-threshold and below threshold activity in order to attenuate reception volume in circuit pairs having concurrent input and output activity.

5. Station apparatus in accordance with claim 1 wherein said input circuits include an initial stage of signal handling for conversion of telphone signals between analog and companded digital delta-coded forms and said output circuit include a final stage of reverse conversion of telephone signals between companded delta-modulation and decompanded analog forms, and wherein said means for providing first control signal indications is coupled to both said conversion and reverse conversion stages for distinguishing between activity and echo-only activity or inactivity, in each said input circuit handling telephone signals, by logical processing of digital step-size argument used in said companding and decompanding.

6. Station apparatus in accordance with claim 5 in combination with:

means for receiving digital telephone signals from remote other station apparatus, via said channels used for receiving, for selective distribution to said output circuits;

means for receiving assignment indications, transmitted from said remote other stations, in prearranged association with said information samples and associated said output circuits; said received indications indicating assignment and non-assignment of channels at said other stations relative to remote input telephone activity directed to said associated output circuits; said non-assignment indications indicating remote blocking of input samples;

a source of digital idle signals in delta code form subject to audible telephonic reproduction as noise having a volume less tha a predetemined threshold level; and means responsive to said received assignment indications to connect said output circuits alternatively with said telephone signal receiving means and said idle signal source, depending respectively upon whether said associated indications represent assignment or non-assignment of a transmission channel in a current multiplex frame for activity samples directed to the associated output circuit.

7. Echo suppressing station apparatus in accordance with claim 6 wherein said means to connect said output circuits is operative relative to inputs of said reverse conversion stages of respective output circuits.

8. Station apparatus in accordance with claim 5 wherein said switch means is operable in either a first mode ($V=0$) in which input circuits are connectively assigned individually to said channels on an exclusive basis or a second mode ($V=1$) in which channels are assigned selectively only to active circuits on a cyclically varying basis in combination with:

a source of digital idle signals in delta coded form subject to audible telephonic reproduction as noise having a volume less than a predetemined threhold activity level; and means responsive to said first control signal indications in respect to input circuits associated with said channels assigned on an exclusive basis in said first mode for causing echo to be suppressed without effectively passing representations of dead silence through said exclusively assigned channels by connecting said exclusively assigned channels alternatively to receive input from said idle signal source whenever the associated first control indication represents the presence of echo-only activity in the respective said input circuit.

9. Echo suppressing station apparatus in accordance with claim 8 wherein said means for causing echo to be suppressed is operative relative to said coding stages of said input circuits.

10. Station apparatus in acordance with claim 5 in combination with:

means coupled to said activity detection means, activity distinguishing means and output circuits for causing said decompanding step-size to be successively decreased and increased relative to a said output circuit as the activity in the associated input circuit varies between states of inactivity or echo-only activity and original activity.

11. Echo suppressing station apparatus in accordance with claim 10 wherein said means for causing said step-size to be decreased and increased is operative relative to an integration stage of said reverse conversion stage.

12. Station apparatus in accordance with claim 11 wherein said means for varying step-size operates to cause temporary modification of a digital integrand representation used in said reverse conversion stage.

* * * * *